United States Patent [19]

Little

[11] 4,345,141
[45] Aug. 17, 1982

[54] ELECTRICAL FUEL PREHEATER ASSEMBLY

[76] Inventor: William D. Little, 3548 Townsend Dr., Dallas, Tex. 75229

[21] Appl. No.: 94,731

[22] Filed: Nov. 15, 1979

[51] Int. Cl.$^3$ .......................... B60L 1/02; H05B 1/02
[52] U.S. Cl. ................................. 219/207; 219/205; 219/202; 219/497; 219/303; 123/549; 123/557; 123/179 G
[58] Field of Search ............... 219/208, 207, 202, 205, 219/203, 303, 501, 494, 497, 499, 504, 505, 306, 308, 309; 123/557, 549, 552, 179 G

[56] References Cited

U.S. PATENT DOCUMENTS

| | | | |
|---|---|---|---|
| 3,817,233 | 6/1974 | Kihn | 123/557 |
| 3,866,587 | 2/1975 | Knapp | 123/557 |
| 3,999,525 | 12/1976 | Stumpp et al. | 123/557 |
| 4,015,567 | 4/1977 | Zabenskie | 123/557 |
| 4,091,265 | 5/1978 | Richards et al. | 123/557 |
| 4,167,663 | 9/1979 | Granzow, Jr. et al. | 219/494 |
| 4,180,036 | 12/1979 | Wolf | 123/557 |

FOREIGN PATENT DOCUMENTS 2646069  4/1978  Fed. Rep. of Germany ...... 123/557

*Primary Examiner*—M. H. Paschall
*Attorney, Agent, or Firm*—Dennis T. Griggs

[57] ABSTRACT

A heater assembly including an electronic control circuit for preheating fuel prior to carburetion in an internal combustion engine is disclosed. Fuel entering the carburetor is heated and maintained at an elevated temperature in a preferred range of about 110° F. to 140° F. by an electrically energized, resistance heating element. The preheater includes a coil of copper tubing through which the fuel is conducted and which is wound about the resistance heating element for indirect heat transfer to the moving mass of fuel. A sensor is interposed in the fuel line downstream of the coiled section and includes a housing in which a temperature probe is received and in which preheated fuel is accumulated prior to being discharged into the carburetor. The resistance heating element is thermally coupled to the sensor housing whereby heat is transferred indirectly to the fuel through the spiral delivery line segment and then through the walls of the sensor housing to the enclosed fuel. According to a preferred embodiment, the volume of the sensor housing chamber is substantially greater than the volume of the spiral delivery line segment, and the mass of the sensor housing is substantially greater than the mass of the spiral delivery line segment. The resistance heating element is energized when the temperature of the fuel in the sensor housing falls below a predetermined threshold temperature, and is de-energized when the fuel temperature rises above the threshold level. This threshold level is detected by comparing an analog temperature signal with a reference signal in a voltage comparator.

1 Claim, 6 Drawing Figures

ELECTRICAL FUEL PREHEATER ASSEMBLY

BACKGROUND OF THE INVENTION

1. Field of the Invention

The present invention relates generally to internal combustion engines, and in particular to heating apparatus for maintaining fuel within a predetermined temperature range.

2. Description of the Prior Art

In an internal combustion engine, the function of a carburetor is to produce a combustible fuel-and-air mixture. In the carburetor, the fuel is distributed in the form of tiny droplets within a stream of air. As a result of heat absorption on the way to the cylinder, these droplets are evaporated, so that the mixture thus becomes an inflammable gas. The efficiency of the engine is directly related to the amount of energy released by combustion of a given volume of gas/air mixture within the cylinder. The primary purpose of the carburetor is to mix the gasoline uniformly with intake air in the proper proportions to produce a good aerosol mixture with the goal of obtaining complete combustion.

In the operation of conventional carburetors, liquid fuel is aspirated from a choke tube by the suction developed within a venturi region of the carburetor air passage. The aspiration of the fuel within this relatively low pressure region causes the fuel to be finely divided into tiny droplets that are carried along in a moving air mass to the cylinder. The size of each fuel droplet produced for a given pressure and air flow rate is dependent upon the viscosity of the fuel, and the viscosity of the fuel is dependent upon its temperature. It will be appreciated that at relatively low temperatures, the fuel droplets will be larger and will be less uniformly distributed throughout the moving air mixture, thereby leading to incomplete combustion. Conversely, it will also be appreciated that as the temperature of the fuel is increased, the fuel droplets constantly diminish in size until vaporized fuel is produced. Because more complete combustion and substantially more energy can be derived from a given volume of fuel aerosol mixture in which the droplets of fuel are very finely divided and uniformly dispersed, as opposed to the same volume of air mixed with superheated fuel vapor, it is desirable to maintain the temperature of the fuel below its boiling point but substantially above the fuel tank temperature.

OBJECTS OF THE INVENTION

It is, therefore, the principal object of the present invention to provide a fuel preheater system for use in combination with an internal combustion engine which is operative for maintaining the temperature of fuel delivered to the carburetor within a predetermined temperature range below the boiling point temperature of the fuel, and substantially above ambient temperature.

The mass flow rate of fuel through a fuel delivery line to a carburetor may vary substantially according to operating conditions such as starting, idling, accelerating and cruising. To improve efficiency and promote complete combustion, the temperature of the fuel delivered to the carburetor should remain within the predetermined temperature range. It is, therefore, an object of the invention to provide a fuel preheater assembly which can accomodate variations in the mass flow rate of fuel associated with the various operating modes, and maintain the fuel within a predetermined temperature range.

According to conventional prior art heater arrangements, the fuel is preheated by circulating it through a heat exchanger which is coupled to the engine's cooling system. It will be appreciated that in this arrangement, heating of the fuel cannot occur during the warmup period, which can be for an extended length of time under cold weather operating conditions, which leads to inefficient operation and air pollution because of incomplete combustion. Therefore, an important object of the invention is to provide a fuel preheater which is completely operable during the warmup phase of engine operation as well as after the engine has reached its normal operating temperature.

Conventional fuel preheater assemblies have typically employed a bridge circuit for detecting fuel temperature variations and for increasing or decreasing the rate of heat transfer to the fuel on a continuous basis. Such systems are relatively expensive to manufacture and are relatively sensitive to voltage variations, especially the type induced by voltage surges and drops associated with starting. It is, therefore, an important object of the invention to provide an electronic control circuit for an electrical resistance heating element which comprises a minimum number of electrical components and which is relatively insensitive to variations in supply of voltage.

SUMMARY OF THE INVENTION

The foregoing objects are achieved by a heater assembly which comprises an electrical resistance heating element, a coiled fuel delivery tube and sensor housing which are connected in fluid communication with each other and both of which are thermally coupled to the heating element, and a control circuit electrically coupled to a temperature transducer probe disposed within the sensor housing in the flow path of the fuel for energizing the heating element when the temperature of the fuel drops below a predetermined threshold level, and for de-energizing the heater when the fuel temperature rises above that predetermined level.

The resistance heating element is thermally coupled to the sensor housing whereby heat is transferred indirectly to the fuel through the coiled delivery line segment and then through the walls of the sensor housing to the enclosed fuel. According to a preferred embodiment, the volume of the sensor housing is substantially greater than the volume of the coiled delivery line segment, and the mass of the sensor housing is substantially greater than the mass of the spiral delivery line segment. In this arrangement, the temperature of the fuel within the sensor housing is maintained within a desired temperature range because of the compensating effect of the large thermal mass and volume of the sensor housing which tend to smooth temperature variations caused by variations in the mass flow rate of the fuel.

The resistance heating element, when energized, generates heat at a substantially constant rate without regard to the fuel flow rate. The heating element is energized at any time that the temperature of the fuel in the sensor housing falls below a predetermined threshold temperature, for example 140° F. This threshold level is detected by comparing an analog temperature signal produced by the thermocouple with a reference signal in a voltage comparator which gates a semiconductor switch ON and OFF. According to a preferred arrangement, the temperature dependent resistance of a thermocouple transducer forms a part of a voltage divider which produces the analog signal for input to a voltage comparator. When the temperature of the fuel is less than the predetermined threshold temperature, the magnitude of the analog voltage will be less than the magnitude of a reference voltage, so that the voltage comparator produces an output signal at a first logic level, either logic ZERO or logic ONE, for controlling the operation of a semiconductor switch.

According to a preferred embodiment, the semiconductor switch is a PNP power transistor, and the output of the voltage comparator is substantially at zero potential at fuel temperature less than the threshold level, whereby the semiconductor switch is forward biased to the fully saturated ON condition, thereby applying power to the resistance heating element. As the fuel temperature increases in response to heat transfer, the resistance of the thermocouple steadily increases until the analog voltage produced by the voltage divider exceeds the reference potential, at which point the voltage comparator delivers either a logic ONE or logic ZERO gate output. According to the previously discussed arrangement, its output rises to the supply level, which is defined as logic ONE, which causes the PNP power transistor to be turned off, thereby interrupting power flow to the heating element.

Because of the thermal inertia associated with the large mass of the sensor housing and because of the relatively large volume of fuel accumulated within the sensor housing, the fuel preheater is relatively insensitive to variations in fuel flow rate. The fuel preheater is energized substantially continuously during the warmup period, but is energized only intermittently after normal engine operating temperatures have been established.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

DESCRIPTION OF THE PREFERRED EMBODIMENT

Figure 1:
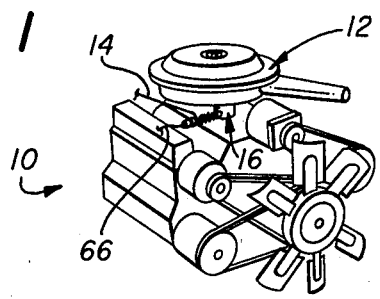
FIG. 1 is a perspective view of an internal combustion engine.

In the description which follows, like parts are marked throughout the specification and drawing with the same reference numerals, respectively. The drawings are not necessarily to scale and in some instances portions have been exaggerated in order to more clearly depict certain features of the invention.

The invention is described in combination with an internal combustion engine in which fuel is atomized by a carburetor for presentation to a combustion cylinder. However, the fuel preheater assembly of the invention can be used to good advantage for heating fuel which is delivered to a fuel injector for admixture with air prior to introduction to the combustion chamber of the engine.

Referring now to FIG. 1, an internal combustion engine 10 includes a carburetor 12 connected to a fuel delivery line 14 for producing a uniform aerosol mixture of gasoline droplets in air for presentation to combustion cylinders in the usual manner. According to the present invention, the fuel system further includes a fuel preheater assembly 16 thermally coupled to the fuel line 14 for heating the fuel to a desired temperature prior to discharge into the carburetor. Electrical power is delivered to the preheater assembly through an ignition switch 17.

Figure 3:
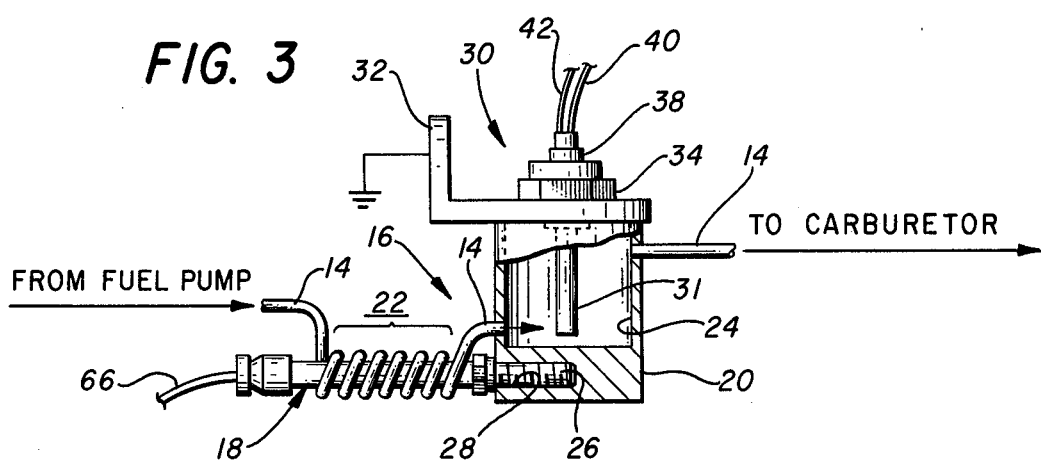
FIG. 3 is an elevation view, partly in section, of a combination fuel preheater and sensor assembly.

Referring now to FIG. 3, the fuel preheater assembly 16 includes an electrical resistance heating element 18, a transducer housing 20 which is mechanically and thermally coupled to the electrical resistance heater 18, and a section 22 of the fuel line which is mechanically coiled in heat transfer engagement around the resistance heater and along its length. The transducer housing 20 includes a chamber 24 which is interposed in the flow path of the fuel line 14 downstream of the coiled section 22. According to this arrangement, fuel passing through the delivery line 14 is heated in a first stage as it passes through the coiled section 22, and then is subsequently heated in a second stage by heat transfer through the walls of the transducer housing 20.

According to the preferred embodiment shown in FIG. 3, the electrical resistance heater element 18 includes a threaded, thermally conductive end portion 26 which is received in threaded engagement within a threaded bore 28 of the transducer housing 20. Thus the resistance heater 18 is thermally and mechanically coupled to the sensor chamber, while the fuel delivery line is thermally and mechanically coupled to the resistance heater, while also being coupled in fluid communication with the sensor chamber 24 for both heat transfer and temperature sensing purposes.

Received within the sensor chamber 24 is a probe transducer 30 for producing an analog signal which is proportional to the temperature of the fuel within the sensor chamber 24. The transducer 30 is preferably a probe thermocouple having a well-type probe element 31 which is completely enclosed by a sheath or shield. The immersion probe transducer 30 is disposed in threaded, sealed engagement with a mounting bracket 32 which is mechanically attached to the carburetor housing. The transducer assembly includes the usual wrenching hex 34, a stainless steel head 36, high temperature insulation which surrounds feed-through pins (not shown), and Chromel-Constantan thermocouple cable 38 which shields conductors 40, 42. These conductors are coupled to a voltage divider circuit which will be described in detail hereinafter.

The resistance heating element 18 is thermally coupled by virtue of threaded engagement to the sensor housing 20 whereby heat is transferred indirectly to the fuel in a first stage through the spiral delivery line segment 22 and then through the walls of the sensor housing to the enclosed fuel in a second heating stage. The volume of the chamber 24 is preferably substantially greater than the volume of the coiled delivery line segment 22, and the mass of the sensor housing 20 is preferably substantially greater than the mass of the coiled delivery line segment 22. According to this arrangement, the temperature of the fuel within the sensor housing is maintained within a desired temperature range because of the compensating affect of the large thermal mass and volume of the sensor housing which tend to smooth temperature variations caused by variations in the mass flow rate of the fuel.

The resistance heating element 18, when energized, generates heat at a substantially constant rate without regard to the fuel flow rate. The heating element is energized any time that the temperature of the fuel in the sensor housing falls below a predetermined threshold level, for example 140° F. This threshold level is detected by comparing an analog temperature signal 44 produced by the thermocouple 30 with a reference signal 46 in a voltage comparator 48 which gates a semiconductor switch 50 on and off.

Figure 2:
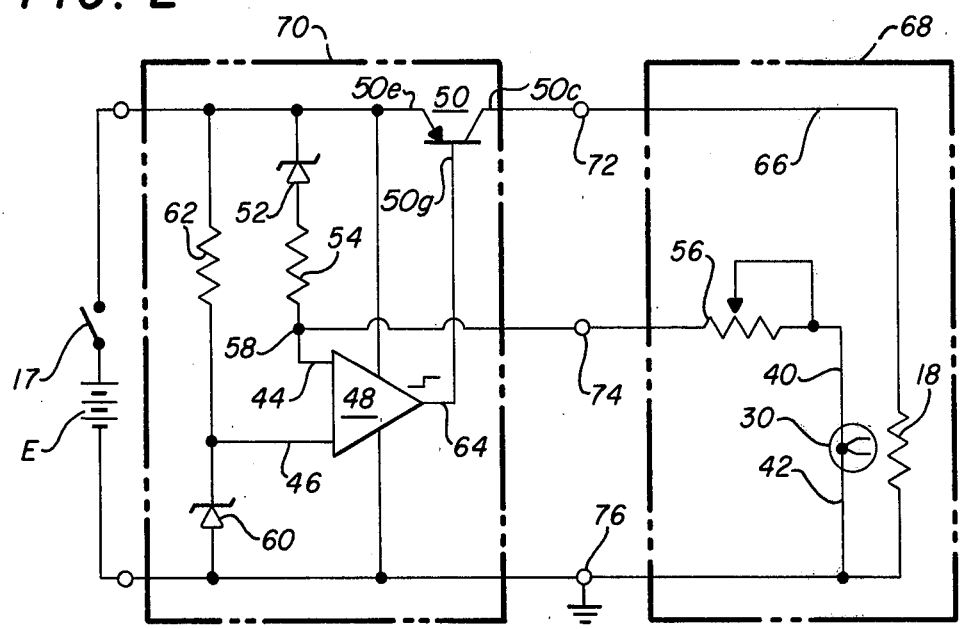
FIG. 2 is an electrical schematic view of the fuel preheater control circuit of the invention.

According to the preferred embodiment shown in FIG. 2, the temperature dependent resistance of the thermocouple transducer 30 forms a part of a voltage divider circuit which produces the analog signal 44 which is proportional to the temperature of the fuel for input to the voltage comparator 48. The voltage divider circuit comprises a breakdown diode 52 and a current limiting resistor 54 which are connected in electrical series relation with the thermocouple 30. Also connected in series relation is an adjustable calibration resistor 56. The breakdown diode 52 is preferably a Zener diode which is connected in reverse bias relation with respect to the polarity of the applied voltage E. According to conventional circuit analysis, the analog temperature voltage signal 44 appearing at the node 58 is given by the following relation $$V_{58} = (E - V_{52}) \frac{R_{30} + R_{56}}{R_{30} + R_{54} + R_{56}}$$

where:
$V_{58}$ is the voltage at node 58;
$V_{52}$ is the breakdown voltage of diode 52;
$R_{30}$ is the resistance of the thermocouple 30;
$R_{56}$ is the resistance of the calibration resistor 56; and,
$R_{54}$ is the resistance of the current limiting resistor 54.

It will be apparent by inspection of the above equation that the magnitude of the analog temperature signal 44 will rise and fall in proportion to the increase and decrease of the resistance of the thermocouple 30. By a careful selection of the breakdown voltage value for the Zener diode 52, and the magnitude of the current limiting resistor 54, the voltage level which corresponds with the desired threshold temperature can be arbitrarily set and adjusted by the calibration resistor 56.

A reference voltage is produced by a breakdown diode 60 which is connected in reverse bias relation in series with the current limiting resistor 62. The breakdown diode 60 is preferably a Zener diode which clamps and provides a well regulated voltage reference signal 46 when energized in reverse bias relation by the storage battery E. The breakdown voltage level of the diode 60 is arbitrarily chosen at a voltage level substantially less than the battery voltage E and within the input range of the voltage comparator 48. After this reference level has been selected, the values of the divider resistor 54 and calibration resistor 56 can be selected to produce an analog voltage signal 44 having a magnitude equal to the reference level at the predetermined temperature threshold.

When the temperature of the fuel is less than the predetermined threshold temperature, upon turn-on of the ignition switch 17, the magnitude of the analog voltage will be less than the magnitude of the reference voltage, so that the voltage comparator 48 produces an output signal 64 at a first logic level, either logic zero or logic one for controlling the operation of the semiconductor switch 50. According to the preferred arrangement shown in FIG. 2, the semiconductor switch 50 is a PNP power transistor having a collector 50c and emitter 50e connected in series electrical relation with the heating element 18, and a gate 50g connected to the comparator output 64. The output of the voltage comparator 48 is substantially at zero potential at all times when the analog signal 44 is less than the magnitude of the reference signal 46, whereby the PNP power switch 50 is forward biased to the fully saturated on condition, thereby applying power through an electrical conductor 66 to the resistance heating element 18. As the fuel temperature in the chamber 24 increases in response to the heat transfer, the resistance $R_{30}$ of the thermocouple steadily increases until the analog signal 44 exceeds the reference potential 46, at which point the voltage comparator 48 delivers either a logic one or logic zero output. According to the previously discussed arrangement, the comparator output signal 64 rises to the supply voltage level E, which is defined as logic ONE, which causes the PNP power transistor to be turned off, thereby interrupting power flow to the heating element 18.

It will be appreciated that the heating element 18 will be energized substantially continuously during the warmup period, especially during cold start conditions, but will be energized only intermittently after normal engine operating temperatures have been established. Additionally, because of the thermal inertia associated with the large mass of the sensor housing and because of the relatively large volume of heated fuel accumulated within the sensor housing, the fuel preheater is relatively insensitive to fuel flow rate variations. Additionally, because the voltage comparator 48 is responsive to a predetermined relative difference between the reference potential and the analog potential, which are both derived from the same source, the control circuit is substantially insensitive to voltage transient and surges associated with engine starting and operation of auxiliary electrical equipment.

The fuel preheater system is preferably fabricated in three separate component assemblies: the combination of the heater element 18, the sensor housing 20, the thermocouple 30, and calibration resistor 56 in one sub-assembly, which may be encapsulated, as represented by the dashed line 68, and the control circuitry including the voltage comparator 48 and power switch 50 in a separate sub-assembly, as indicated by the dashed line 70. This arrangement allows the heater assembly to be mounted in close proximity with the inlet port of the carburetor while permitting the control circuit 70 to be mounted in a more protected environment, for example on the other side of the fire wall, with the two subassemblies electrically coupled by interconnects 72, 74, 76.

Figure 4:
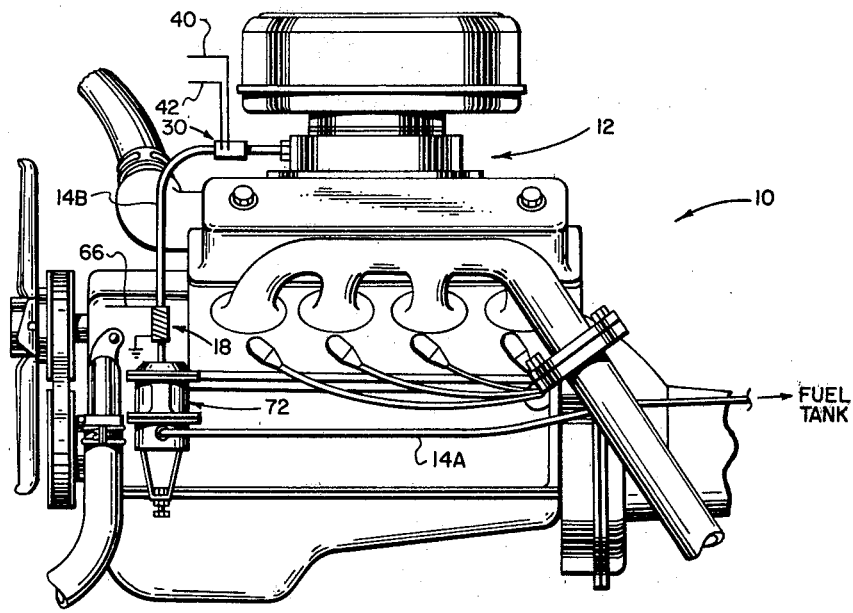
FIG. 4 is an elevation view of an internal combustion engine showing an alternative heater/sensor installation.
Figure 5:
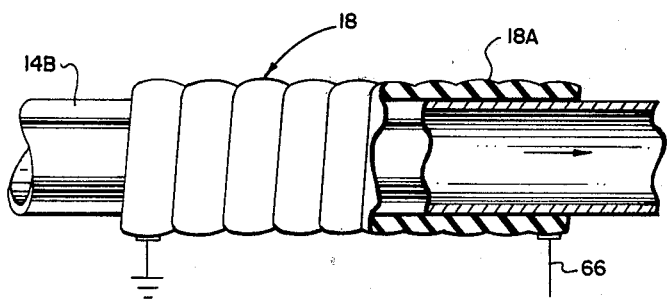
FIG. 5 is an elevation view, partly in section, of an alternative heating element installation; and, FIG. 6 is an elevation view, partly in section, of an alternative sensor installation.
Figure 6:
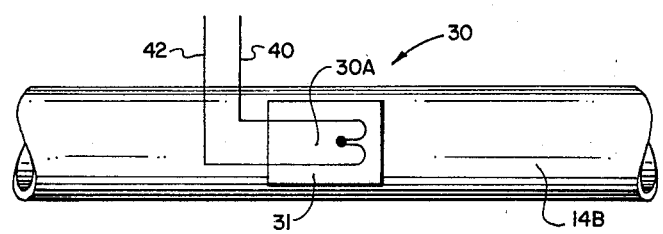

Referring now to FIG. 4, an alternative heater/sensor installation is illustrated. In some cases it may be desirable to install the heater and the sensor without modifying the fuel line 14. Fuel is conveyed through a first delivery line segment 14A to a fuel pump 72 and thence to the carburetor 12 through a fuel line segment 14B. The heater 18 and sensor 30 are both coupled in thermal engagement with the exterior surface of the fuel delivery line section 14B. In this arrangement, the heater assembly 18 preferably comprises a strip of electrical heater tape 18A wound in a spiral path around the fuel delivery line 14B as shown in FIG. 5. The sensor assembly 30 preferably comprises a foil thermocouple 30A of the type designed for surface temperature measurements where thin sensing junctions are required. The thermocouple foil is preferably embedded in a very thin plastic matrix base 31 which is bonded to the thermally conductive cylindrical surface of the fuel delivery line 14B as shown in FIG. 6.

The assembly shown in FIG. 4 is easily installed in the field without the use of special tools, and without severing or otherwise modifying the fuel delivery line 14B. The heater assembly 18 and sensor assembly 30 are preferably widely separated in this arrangement whereby a temperature gradient can be established along the fuel delivery line between the heater and the sensor. This separation is important in order to minimize the thermal distortion which would otherwise occur because of direct heating between the heater assembly and the sensor if the two were closely adjacent to one another. Additionally, the sensor assembly should be located closely adjacent to the inlet of the carburetor 12 in order to sense the temperature of the fuel as it enters the carburetor. According to this arrangement, the surface temperature of the fuel line 14B at the entrance to the carburetor 12 is assumed to be substantially equal to the temperature of the fuel as it enters the carburetor, and it is also assumed, because of the moving mass of fuel and the long length of fuel line between the heater and sensor, that the temperature gradient is large enough to prevent thermal masking of the actual fuel temperature by direct heating of the sensor through the delivery line segment.

This invention may be embodied in other specific forms without departing from the spirit or essential characteristics thereof. For example, although the semiconductor switch is embodied in the form of a PNP transistor, NPN devices may be used to good advantage with slight circuit modifications. Additionally, the temperature transducer need not be a thermocouple having a positive temperature coefficient, but could be a thermistor having a negative temperature coefficient. Further, it will be apparent to those skilled in the art that other comparator circuits such as a Schmidt trigger could be used to carry out the function of the voltage comparator. Therefore the present embodiment should be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. An electrical fuel preheater assembly for use in combination with a fuel delivery line comprising, in combination:
   a housing having an interior chamber defining a fuel reservoir, an inlet port and an outlet port adapted for connection in series fluid circuit relation to the fuel delivery line;
   an elongated, thermally conductive electrical heating element coupled in heat transfer relation to said reservoir housing;
   a thermally conductive delivery tube engaging the exterior sidewall of the elongated heating element in a multiple turn, spiral path along one end of said heating element, said delivery tube having an inlet port adapted for connection in series fluid circuit relation with said fuel delivery line and having an outlet port connected to the inlet port of said reservoir housing;
   the volume of the reservoir housing chamber being substantially greater than the volume of the spiral delivery tube segment around said heater element;
   a thermocouple sensor having an immersion probe received within the reservoir housing chamber for sensing the temperature of fuel in the reservoir; and,
   circuit control means coupled to the thermocouple sensor and to the electrical heating element for interrupting the flow of electrical current from a power source to said heating element in response to the temperature of fuel in the sensor housing reservoir rising above a predetermined level.

* * * * *